United States Patent

Billgren et al.

[11] Patent Number: 5,840,152
[45] Date of Patent: Nov. 24, 1998

[54] APPARATUS FOR JOINING TOGETHER TWO WEBS OF MATERIAL

[75] Inventors: Thomas Billgren, Kullavik, Sweden; Maurice Leclercq, Drucat; Francis Robert, Neufmoulin, both of France

[73] Assignee: Molnlycke AB, Gothenburg, Sweden

[21] Appl. No.: 849,669

[22] PCT Filed: Dec. 5, 1995

[86] PCT No.: PCT/SE95/01456

§ 371 Date: Jun. 11, 1997

§ 102(e) Date: Jun. 11, 1997

[87] PCT Pub. No.: WO96/18502

PCT Pub. Date: Jun. 20, 1996

[30] Foreign Application Priority Data

Dec. 13, 1994 [SE] Sweden .................................. 9404351

[51] Int. Cl.⁶ .................................................. B32B 31/30
[52] U.S. Cl. ........................ 156/498; 156/501; 156/555; 156/582
[58] Field of Search ............................... 156/242, 244.11, 156/285, 498, 499, 500, 501, 555, 580, 581, 582, 583.1

[56] References Cited

U.S. PATENT DOCUMENTS

| | | |
|---|---|---|
| 2,607,712 | 8/1952 | Sturken .................................. 156/501 |
| 2,690,206 | 9/1954 | Mueller .................................. 156/501 |
| 3,294,613 | 12/1966 | Eichler .................................. 156/242 |
| 3,598,681 | 8/1971 | Jeppsson et al. .................... 156/501 X |
| 3,658,617 | 4/1972 | Fearnow et al. ......................... 156/235 |
| 4,556,527 | 12/1985 | Sarcander ................................. 264/171 |
| 4,576,669 | 3/1986 | Caputo .................................... 156/145 |

*Primary Examiner*—James Sells
*Attorney, Agent, or Firm*—Young & Thompson

[57] ABSTRACT

An apparatus for joining a first web (8) consisting of plastic material to a second web (9) consisting of absorbent material, wherein the arrangement includes a cooling-roll (1), a counter-roll (2), and means for feeding the first and the second webs through the nip defined between the cooling-roll and the counter-roll, the webs being pressed together in the nip, and wherein the plastic material in the first web (8) is in a plastic state when entering the nip. A pattern of molds (5) having air-permeable bottoms is arranged over at least a part of the mantle surface of the cooling-roll (1) and a vacuum box (7) is arranged inwardly of the cooling-roll mantle in the region of abutment of the first web (8) with the cooling roll, with cooling devices (3, 4) for cooling the cooling-roll mantle from outside the roll.

8 Claims, 1 Drawing Sheet

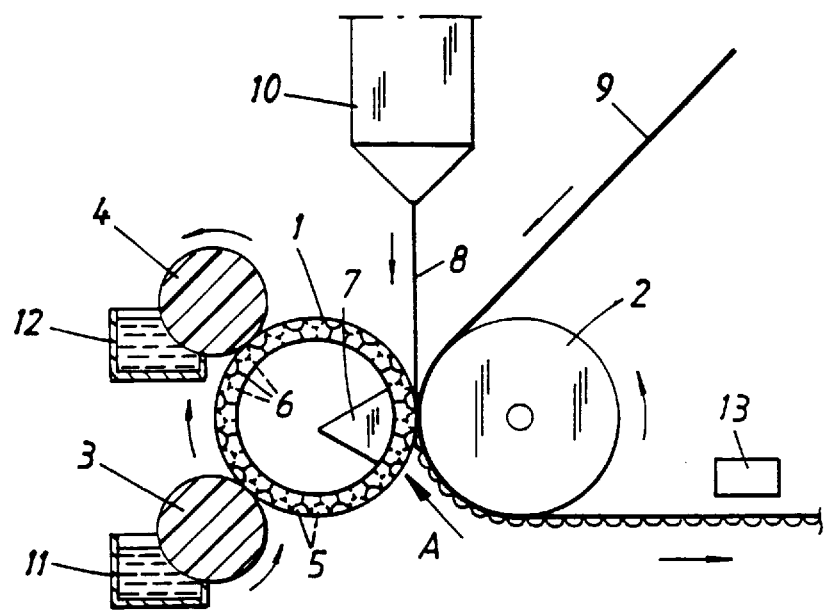
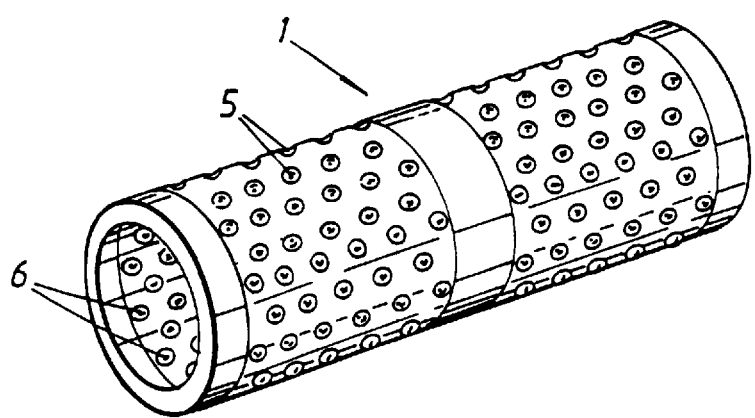

APPARATUS FOR JOINING TOGETHER TWO WEBS OF MATERIAL

BACKGROUND OF THE INVENTION

The present invention relates to apparatus for joining a first web of plastic material to a second web of absorbent material which comprises a cooling-roll, a counter-roll, and means for feeding the first and the second webs through the roll nip so as to press the webs together, wherein the plastic material in the first web is in a plastic state at the time of entering the nip. The invention is particularly intended for the manufacture of starting material for a two-layered surgical drape which comprises an upper layer of absorbent material and a bottom layer of plastic material that has provided on the underside thereof a pattern of outwardly extending projections.

One problem encountered in the design of such apparatus resides in achieving uniform cooling over the whole of the outer cylindrical surface of the cooling-roll, particularly when the cooling-roll is, at the same time, constructed to achieve vacuum forming of the first web and thus includes on its mantle surface a pattern of air-permeable moulds which coact with a vacuum box disposed in the interior of the cooling-roll. It is difficult to provide such cooling-rolls with both cooling channels and suction channels without influencing the function of the arrangement in a negative sense. Furthermore, surgical drapes are produced in several different sizes, and it is therefore desirable to be able to change the pattern roll in such apparatus without undue difficulty. The plastic layer, or sheet, of such surgical drapes is also intended to form a liquid barrier, and it is therefore desirable that the manufacturing process will enable an imperviousness check to be carried out on the manufactured composite web.

SUMMARY OF THE INVENTION

An object of the present invention is to solve the aforesaid problems and to satisfy the aforesaid desiderata. In accordance with the invention, this object is achieved with an arrangement of apparatus the kind defined in the introduction which is characterized in that the cooling-roll is provided with a pattern of molds having air-permeable bottoms over at least a part of its mantle surface or outer periphery; in that a vacuum box is disposed inwardly of the cooling-roll mantle in the region in which the first web abuts the cooling-roll; and in that cooling means are provided for cooling the mantle of the cooling-roll from outside said roll.

In the case of one preferred embodiment, the cooling means include devices for applying a film of cooling liquid to the peripheral surface of the cooling-roll. Furthermore, the web feed devices are arranged to move the combined webs into abutment with the counter-roll after exiting from the nip defined between the cooling-roll and the counter-roll, and the vacuum box extends in the peripheral direction of the cooling-roll beyond said nip. The cooling-roll comprises a tubular body carried by the counter-roll and at least two further support-rolls which are mutually spaced from one another along the periphery of the tubular body and of which at least one is driven. In the case of one preferred variant, the support-rolls are arranged to apply a film of liquid on the mantle surface of the cooling-roll and part of the peripheral surface of the support-rolls is located in a water bath. The arrangement also includes means for detecting the presence of any liquid that may have been absorbed by absorbent material in the composite web comprised of said combined first and second webs, said means having the form of a moisture content measuring device.

BRIEF DESCRIPTION OF THE DRAWINGS

The invention will now be described in more detail with reference to the accompanying drawings, in which FIG. 1 is a schematic, partially cut-away side view of a preferred embodiment of an inventive arrangement; and FIG. 2 is a schematic view in perspective of a pattern roll forming part of the arrangement shown in FIG. 1.

DESCRIPTION OF THE PREFERRED EMBODIMENTS

The arrangement illustrated in FIG. 1 includes a metal cooling-roll 1, for instance made of bronze or steel, and a rubber counter-roll 2. The cooling-roll 1 lies against the counter-roll 2 and also against two support-rolls 3, 4, preferably rubber rolls. At least one of the rolls 2–4 is driven and, in turn, drives the freely rotating roll or rolls. The cooling-roll 1 has the form of a tubular body which is open at both ends and has a pattern of molds 5 provided on its mantle surface or outer periphery. A channel 6 leads from each mould bottom to the interior of the body 1. A vacuum box 7 is mounted inside the tubular body. Although not shown, the arrangement also includes conventional means for feeding a web 8 of plastic material and a web 9 of absorbent material, preferably nonwoven material, through the nip defined between the cooling-roll 1 and the counter-roll 2. The web 8 is drawn from an extrusion nozzle 10 and is still in a plastic state when it reaches the cooling-roll 1.

In operation, the web of plastic material 8 is drawn into the molds 5 as a result of the subpressure generated in the vacuum box 7, while those parts of the web that lie between the molds are pressed against the web of absorbent material as it passes through the nip between the cooling-roll and the counter-roll. After leaving the nip, the combined composite web comprised of the absorbent layer and the patterned plastic layer is moved to the right in FIG. 1 into abutment with the counter-roll.

Necessary cooling of the mantle surface of the cooling-roll and therewith also of the plastic material is achieved by rotating the support-rolls 3, 4 in a water bath 11, 12, these rolls entraining from respective baths water which is transferred to the cooling-roll 1. A film of cooling liquid is therewith formed on the peripheral surface of the cooling-roll. Naturally, other methods of supplying liquid to the peripheral surface of the cooling-roll are conceivable within the scope of the invention, for instance by spraying the rolls. In order to further cool the plastic web after its passage through the nip defined between the cooling- and counter-rolls, the vacuum box 7 extends slightly beyond the nip in the peripheral direction of the cooling-roll. In this way, ambient air will be drawn into the vacuum box, thus generating a stream of air which functions to cool the plastic web as it exits from the nip, as indicated by the arrow A in FIG. 1. This stream of cooling air can be readily controlled, by adjusting the subpressure in the vacuum box.

The rate at which the plastic web 8 is fed through the nip between the cooling-roll and the counter-roll is greater than the rate at which the web exits from the extrusion nozzle 10, meaning that the web is stretched and thinned during its passage from nozzle to nip. Should the plastic material contain thickenings, particle contaminants or the like, it may happen that microscopic holes appear in the web. Such holes are not easily noticed and at present there is no simple and inexpensive method by means of which the imperviousness of such a plastic layer can be checked. However, the described arrangement enables the imperviousness of the plastic layer in the composite web comprising said absorbent layer and said plastic layer to be easily checked, since if the plastic layer is pervious to liquid the absorbent fibre layer will absorb liquid from the liquid film on the cooling-roll. Those regions of the absorbent fibre layer that have absorbed liquid can then be detected with the aid of a moisture detecting device of conventional kind, for instance an optical meter such as a Line Scan Camera or laser scan equipment.

FIG. 2 illustrates schematically and in perspective a cooling-roll 1 which can suitably be used in the arrangement shown in FIG. 1. The mantle surface of the illustrated cooling-roll 1 has both patterned and non-patterned parts. These non-patterned parts are necessary because the edges of the surgical drape should be smooth. The cooling-roll illustrated in FIG. 2 functions to produce starting material for two surgical drapes. Starting material for the manufacture of surgical drapes for which the invention is particularly intended comes in several sizes however, and it is therefore necessary to be able to change the cooling-rolls quickly. Because the cooling-roll 1 is supported by the counter-roll and the support-rolls 3, 4, it is particularly easy to change the cooling-roll in an arrangement constructed in accordance with the invention. With the intention of facilitating this exchange, one of the rolls, for instance the counter-roll 2 or the support-roll 4, is movably mounted so as to enable the roll to be moved to one side, therewith enabling the cooling-roll 1 to be easily removed. Because the cooling-roll is comprised solely of a tubular body, the roll can also be easily handled, which further facilitates its exchange.

Thus, the invention provides an arrangement for manufacturing a two-layer starting material for a surgical drape that includes a patterned plastic layer or sheet, in which the cooling-roll is used to vacuum-form a desired pattern on the plastic layer without the cooling channels in the roll disturbing its cooling function. The cooling with a liquid taken from an external source also enables the imperviousness of the plastic layer to be monitored. The cooling-roll is also mounted to enable it to be replaced with another cooling-roll that has another pattern, wherewith the standstill times occasioned by switching between different pattern rolls is kept very short.

It will be understood that the aforedescribed exemplifying embodiment of the invention can be modified within the scope of the invention. For instance, the cooling-roll may be driven with the aid of a gear drive which coacts with one or more internal or external toothed rings attached to the roll.

The cooling-roll may also be supported and cooled by more than two support-rolls. The invention is therefore restricted solely by the contents of the following claims.

We claim:

1. Apparatus for joining a first web (8) consisting of plastic material to a second web (9) consisting of absorbent material, wherein the apparatus includes a cooling-roll (1), a counter-roll (2), and means for feeding the first and the second webs through a nip defined between the cooling-roll and the counter-roll, said webs being pressed together in said nip, and wherein the plastic material in the first web (8) is in a plastic state when entering the nip, wherein a pattern of molds (5) having air-permeable bottoms is arranged over at least a part of a mantle surface of the cooling-roll (1); a vacuum box (7) is disposed inwardly of the mantle in the region of abutment of the first web (8) with the cooling-roll; and the apparatus also includes cooling devices for cooling the mantle from outside said cooling roll.

2. Apparatus according to claim 1, wherein the cooling devices include means for applying a film of cooling liquid on a peripheral surface of the cooling roll (1).

3. Apparatus according to claim 1, wherein the means for feeding the first and second webs is arranged to move a composite web formed in the nip defined between the cooling-roll and the counter-roll (1 and 2 respectively) into abutment with the counter-roll (2) after leaving said nip; and the vacuum box (7) extends beyond the nip in a peripheral direction of the cooling roll.

4. Apparatus according to claim 1, wherein the cooling-roll (1) is a tubular body which is carried by the counter-roll (2) and at least two further support-rolls which are spaced apart around a periphery of said cooling-roll and a means for driving at least one of said counter-roll and said two further support-rolls.

5. Apparatus according to claim 4, wherein the support-rolls are adapted to apply a film of liquid on the mantle surface of the cooling roll (1).

6. Apparatus according to claim 5, wherein part of a peripheral surface of at least one of the support rolls (3, 4) is located in a water bath (11, 12).

7. Apparatus according to claim 1, further comprising detecting means (13) for detecting the presence of liquid in an absorbent web (9) in a composite web formed by said first and said second webs.

8. Apparatus according to claim 7, wherein the detecting means (13) is a moisture content measuring device.

* * * * *